(12) United States Patent
Chun

(10) Patent No.: US 7,389,200 B2
(45) Date of Patent: Jun. 17, 2008

(54) INCREMENTAL ENCODING AND DECODING APPARATUS AND METHOD

(75) Inventor: Young-Sun Chun, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 135 days.

(21) Appl. No.: 11/025,932

(22) Filed: Jan. 3, 2005

(65) Prior Publication Data
US 2005/0174107 A1    Aug. 11, 2005

(30) Foreign Application Priority Data
Jan. 26, 2004    (KR) .................. 10-2004-0004685

(51) Int. Cl.
*G01B 21/00* (2006.01)
*G01B 5/02* (2006.01)

(52) U.S. Cl. ................. 702/163; 702/94; 702/97; 702/150; 702/155; 702/158; 702/189

(58) Field of Classification Search ............ 702/163, 702/94, 95, 97, 127, 150, 151, 155, 158, 702/164, 166, 189; 73/290 R, 314, 490, 73/861.77; 341/110, 111; 347/19; 377/1, 377/17, 18, 19, 24
See application file for complete search history.

(56) References Cited

U.S. PATENT DOCUMENTS

| | | | | |
|---|---|---|---|---|
| 3,515,888 A | * | 6/1970 | Lewis | .................. 250/237 R |
| 3,551,649 A | * | 12/1970 | Weber | ..................... 377/17 |
| 3,794,916 A | * | 2/1974 | Ritzenthaler | ............. 327/99 D |
| 4,457,639 A | | 7/1984 | Nagai | |
| 4,558,304 A | * | 12/1985 | Wand | ..................... 341/115 |
| 4,891,764 A | * | 1/1990 | McIntosh | ................ 700/183 |
| 5,257,024 A | * | 10/1993 | West | ...................... 341/16 |
| 5,612,602 A | * | 3/1997 | Kubota et al. | ............. 318/560 |
| 5,652,494 A | * | 7/1997 | Sugden | .................. 318/701 |
| 5,933,106 A | | 8/1999 | He et al. | |
| 6,354,691 B1 | | 3/2002 | Uchikata | |
| 6,407,683 B1 | | 6/2002 | Dreibelbis | |
| 6,501,403 B2 | | 12/2002 | Weibel, IV et al. | |
| 2004/0227559 A1 | * | 11/2004 | Erba et al. | ................ 327/356 |
| 2005/0012481 A1 | * | 1/2005 | Kang et al. | .............. 318/268 |
| 2005/0174107 A1 | * | 8/2005 | Chun | ................. 324/207.11 |

FOREIGN PATENT DOCUMENTS

| | | |
|---|---|---|
| JP | 61-263779 | 11/1986 |
| JP | 06-137891 | 5/1994 |
| JP | 08-219810 | 8/1996 |

* cited by examiner

*Primary Examiner*—Edward R Cosimano
(74) *Attorney, Agent, or Firm*—Roylance, Abrams, Berdo & Goodman, LLP

(57) ABSTRACT

An incremental encoding and decoding apparatus and method are provided. The incremental encoding and decoding apparatus comprises current converters, which respectively receive the pair of analog signals and convert the received analog signals into current signals each having a predetermined magnitude and phase; and frequency multipliers, which respectively convert the current signals into voltage signals each having an increased frequency compared to the frequencies of the current signals.

18 Claims, 5 Drawing Sheets

INCREMENTAL ENCODING AND DECODING APPARATUS AND METHOD

CROSS-REFERENCE TO RELATED APPLICATION

This application claims the benefit under 35 U.S.C. §119(a) of Korean Patent Application No. 2004-04685, filed on Jan. 26, 2004, in the Korean Intellectual Property Office, the entire disclosure of which is hereby incorporated by reference.

BACKGROUND OF THE INVENTION

1. Field of the Invention

The present invention relates to a position measurement and control apparatus and method. More particularly, the present invention relates to an apparatus and method for controlling the position of an object with high precision.

2. Description of the Related Art

FIG. 1 is a block diagram illustrating a conventional incremental encoder sensing system for position measurement. Referring to FIG. 1, the conventional incremental encoder sensing system includes an analog encoder sensor 100, an analog inverter 110, a quadrature signal generator 120, a 4:1 analog multiplexer 130, an analog-to-digital (A/D) converter 140, and an absolute position converter 150.

The analog encoder sensor 100 outputs pseudo sine or cosine waves X and Y. The pseudo sine or cosine waves X and Y have a phase difference of 90 degrees. Thereafter, the pseudo sine or cosine waves X and Y are inverted by the analog inverter 110, and the inverted pseudo sine or cosine waves nX and nY are input to the 4:1 analog multiplexer 130 together with the pseudo sine or cosine waves X and Y.

The quadrature signal generator 120 receives the pseudo sine or cosine waves X and Y and enables the 4:1 analog multiplexer 130 to select and output one of the four waves input thereto. A wave or signal output from the 4:1 analog multiplexer 130 provides rather general position information to the A/D converter 140, and the A/D converter 140 processes the position information received from the 4:1 analog multiplexer 130, thereby obtaining more specific position information. The absolute position converter 150 further refines the position information received from the A/D converter 140, thereby providing even more specific position information. The position information output from the absolute position converter 150 is used in, for example, a servo system.

The conventional incremental encoder sensing system divides one cycle of a pseudo sine wave by 4 by using a comparator, thereby obtaining general position information. Thereafter, an analog signal containing specific position information is selected using the 4:1 analog multiplexer 130 and then digitalized using the analog-to-digital converter 140. Accordingly, position information in one cycle of the pseudo sine wave can be obtained using the general position information and the specific position information.

Examples of conventional incremental encoder sensing systems are disclosed in U.S. Pat. Nos. 4,457,639 and 5,933,106.

The pseudo sine or cosine waves X and Y output from the analog encoder 100 of FIG. 1 are input to an analog multiplier, thereby obtaining signals with two times higher frequencies than those of the pseudo sine or cosine waves X and Y. The signals are used as information for position determination. This type of technique is disclosed in Korean Patent Application No. 2003-0048648. However, the analog multiplier is large and expensive, and thus it is difficult to apply the analog multiplier to a device with a high integration density.

In order to increase the precision of position determination of the conventional incremental encoder sensing system of FIG. 1, the structure of the conventional incremental encoder may inevitably become very complicated and may need a processor, such as a central processing unit (CPU), in which case the structure of the conventional incremental encoder sensing system becomes even more complex. When assisted by the processor, the conventional incremental encoder sensing system needs a predetermined software program to control the processor, in which case the performance of the conventional incremental encoder sensing system inevitably deteriorates.

In short, in order to enhance the precision of position determination of the conventional incremental encoder sensing system, the structure of the corresponding incremental encoder sensing system may need to become excessively complicated, which results in deterioration of the performance of the corresponding incremental encoder sensing system. Therefore, it is difficult to achieve a desired level of precision for position determination by using the conventional incremental encoder sensing system.

Accordingly, there is a need for an incremental encoder system having enhanced precision while not being overly complex or expensive.

SUMMARY OF THE INVENTION

Embodiments of the present invention provide an incremental encoding and decoding apparatus and method, which can easily achieve a desired level of precision of position determination without increasing the complexity of an entire system and deteriorating the performance of the entire system.

According to an aspect of the present invention, there is provided an incremental encoding and decoding apparatus, which determines position by processing a pair of analog signals output from an analog encoder. The incremental encoding and decoding apparatus comprises current converters, which respectively receive the pair of analog signals and convert the received analog signals into current signals each having a predetermined magnitude and phase, and frequency converting multipliers, which respectively convert the current signals into voltage signals each having an increased frequency compared to the frequencies of the current signals.

According to another aspect of the present invention, there is provided an incremental encoding and decoding method, which determines position by processing a pair of analog signals output from an analog encoder. The incremental encoding and decoding method involves (a) receiving the pair of analog signals; (b) converting each of the analog signals into a current signal having a predetermined magnitude and phase; and (c) converting the current signal into a voltage signal having an increased frequency.

BRIEF DESCRIPTION OF THE DRAWINGS

The above and other features and advantages of the present invention will become more apparent by describing in detail exemplary embodiments thereof with reference to the attached drawings in which.

Throughout the drawings, like reference numbers will be understood to refer to like elements, features and structures.

DETAILED DESCRIPTION OF THE EXEMPLARY EMBODIMENTS

The present invention will now be described more fully with reference to the accompanying drawings, in which exemplary embodiments of the invention are shown.

Figure 2:
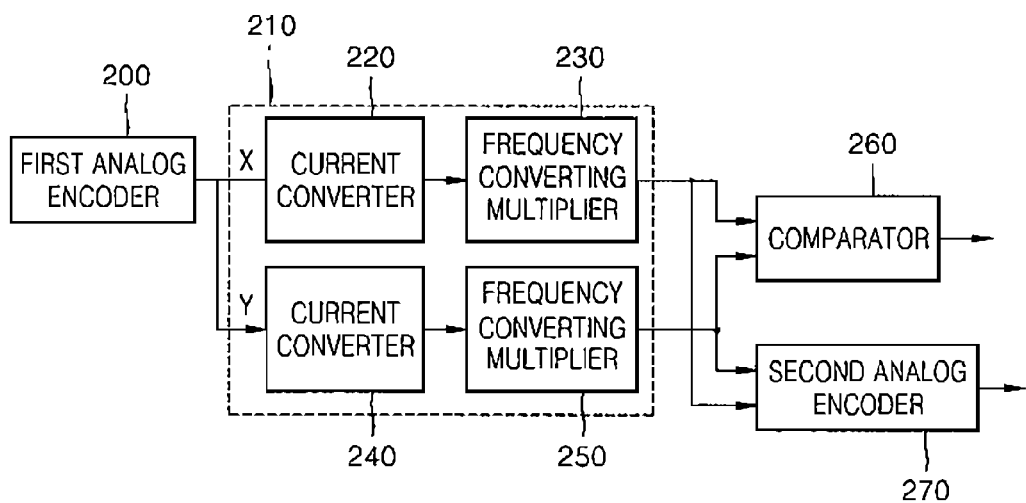
FIG. 2 is a block diagram of an incremental encoding and decoding apparatus according to an exemplary embodiment of the present invention.

FIG. 2 is a block diagram of an incremental encoding and decoding apparatus 210 according to an exemplary embodiment of the present invention. Referring to FIG. 2, the incremental encoding and decoding apparatus 210 generates a signal, which is necessary for determining position, by processing a pair of signals output from a first analog encoder 200. The incremental encoding and decoding apparatus 210 comprises current converters 220 and 240, which respectively receive the pair of signals from the first analog encoder 200 and then convert the voltages of the pair of signals into current signals having predetermined intensities and phases, and frequency converting multipliers 230 and 250, which respectively convert the current signals output from the current converters 220 and 240 into voltage signals each having an increased frequency compared to the frequencies of the respective current signals.

Position information can be extracted from the analog voltage signals output from the frequency converting multipliers 230 and 250. The voltage signals may be replaced with signals output from the analog encoder sensor 100 of the conventional incremental encoder sensing system of FIG. 1. The voltage signals may be input to a comparator 260 or a second analog encoder 270 or both and then processed, thereby obtaining the position information.

Figure 3:
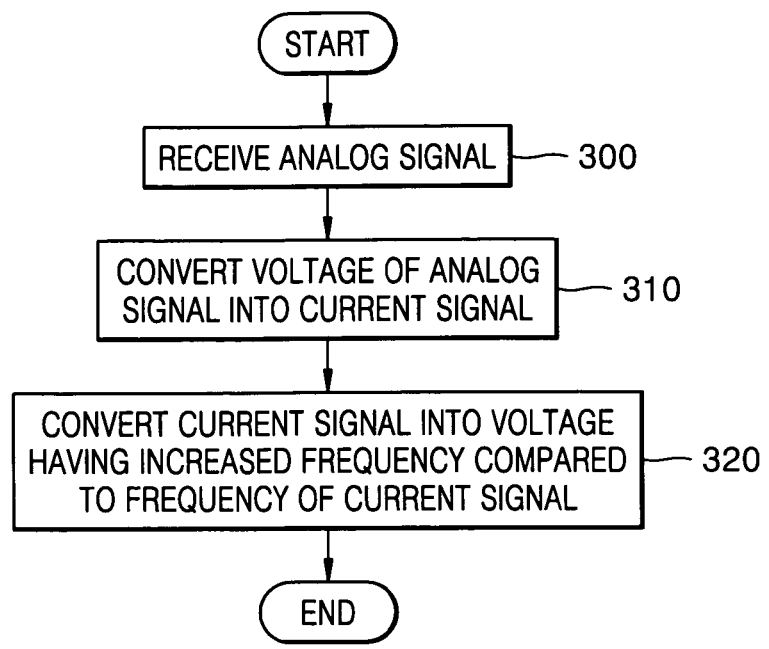
FIG. 3 is a flowchart of an incremental encoding and decoding method according to an exemplary embodiment of the present invention.

FIG. 3 is a flowchart of an incremental encoding and decoding method according to an exemplary embodiment of the present invention. Referring to FIG. 3, the incremental encoding and decoding method determines position information by processing a pair of analog signals output from an analog encoder and involves receiving the pair of analog signals output from the analog encoder in operation 300, converting the pair of analog signals into current signals having predetermined intensities and phases in operation 310, and converting the current signals into voltage signals each having an increased frequency compared to the frequencies of the respective current signals in operation 320.

Figure 1:
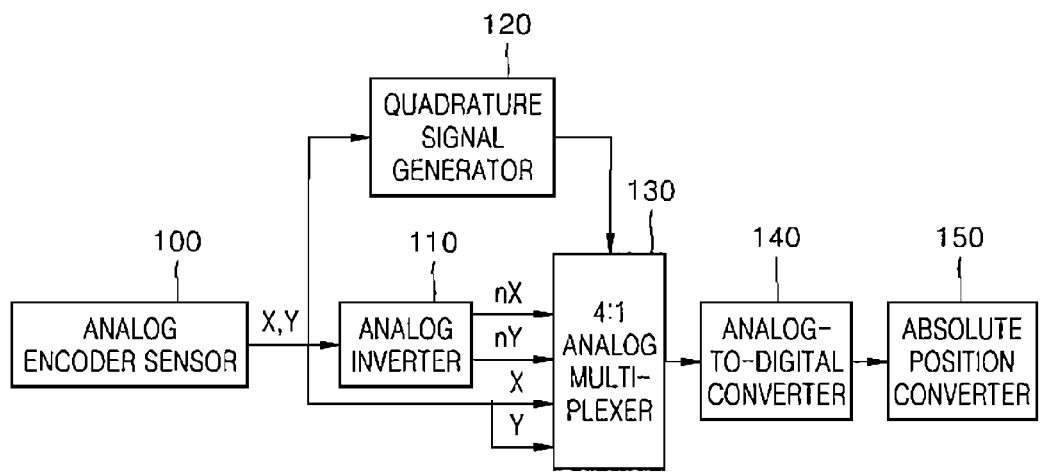
FIG. 1 is a block diagram of a conventional incremental encoder sensing system for position measurement.

Referring back to FIG. 2, the first analog encoder 200 like the analog encoder sensor 100 of FIG. 1, outputs two pseudo sine or cosine signals X and Y having a phase difference of 90 degrees therebetween. The first analog encoder 200 is installed in an object whose position information needs to be obtained, such as a servo motor. Accordingly, analog signals containing the position information of the servo motor are output from the first analog encoder 200, and more specific position information of the servo motor can be obtained with a high precision by processing the analog signals.

The two pseudo sine or cosine signals X and Y output from the first analog encoder 200 are input to the incremental encoding and decoding apparatus 210 in operation 300. The two pseudo sine or cosine signals X and Y have a phase difference therebetween and are processed in substantially the same manner. Thus, a detailed description of how only one of the two pseudo sine or cosine signals, for example, X, is processed will now be presented.

The current converter 220 receives the output signal X of the first analog encoder 200 and converts the output signal X of the first analog encoder 200 into a current signal in operation 310. Here, the current converter 220 may linearly convert the output signal X of the first analog encoder 200 into a current signal by using Equation (1) below:

$$y = aX + b \qquad \text{Equation (1)}$$

where y is an output signal of the current converter 220, a is a scale constant, and b is a bias constant.

The current signal output from the current converter 220 has a different magnitude and phase from the output signal X of the first analog encoder 200.

The frequency multiplier 230 receives the current signal from the current converter 220, multiplies the frequency of the current signal, and converts the current signal into a voltage signal in operation 320. In the conventional incremental encoder sensing system of FIG. 1, a signal is output from the analog encoder sensor 100 and then processed by passing the signal through the rest of the conventional incremental encoder sensing system as a voltage signal. Likewise, the output signal of the frequency multiplier 230 is a voltage signal so that compatibility between the incremental encoding and decoding apparatus 210 and other existing systems can be guaranteed.

Preferably, but not necessarily, the frequency multiplier 230 comprises a unijunction transistor (UJT), which obtains a voltage signal corresponding to the level of current input thereto and converts the voltage signal into another voltage signal having an increased frequency compared to the frequency of the original voltage signal. The unijunction transistor is also called a double base diode and is used, for example, in a trigger pulse generator for a thyristor.

Figure 4:
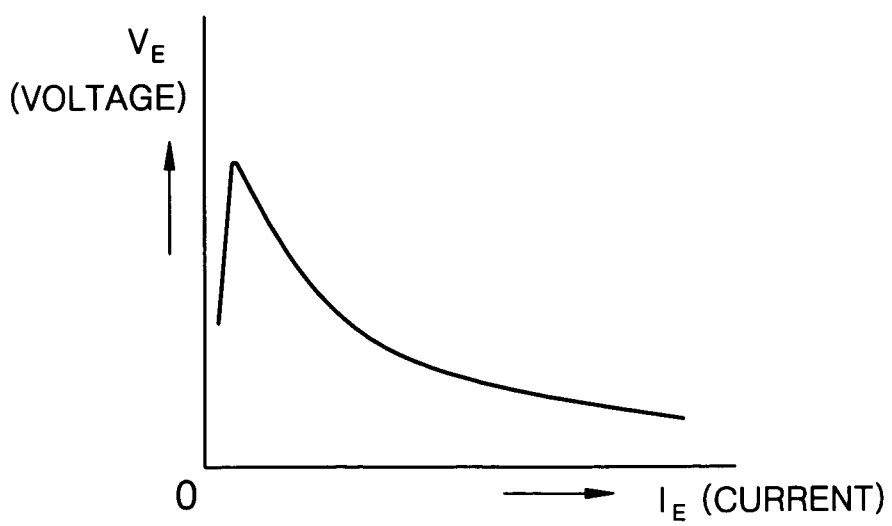
FIG. 4 is a graph illustrating the input/output characteristics of a unijunction transistor, which receives a current signal and outputs a voltage signal in response to the reception of the current signal.

FIG. 4 is a graph illustrating the input and output characteristics of a unijunction transistor. Referring to FIG. 4, the unijunction transistor receives a current signal and outputs a voltage signal by following a curve depicted in FIG. 4.

Figure 5:
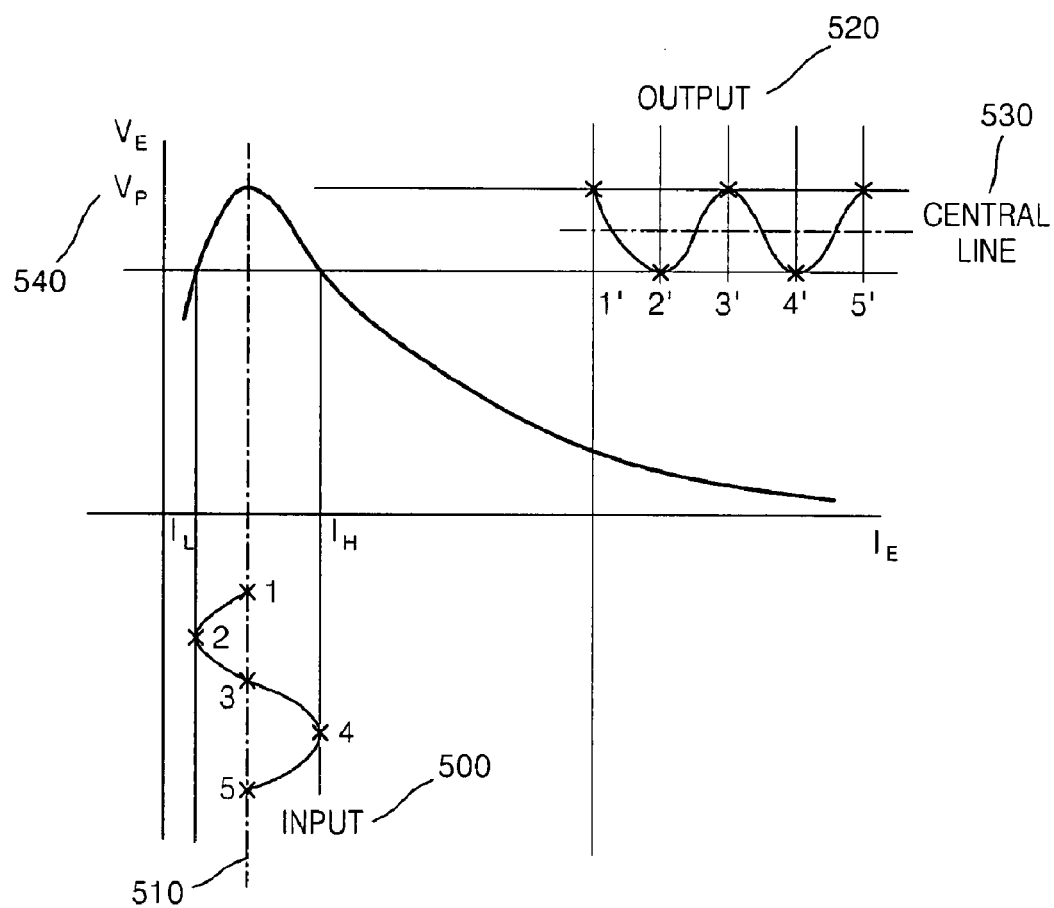
FIG. 5 is a graph illustrating the waveform of the voltage signal output from the unijunction transistor in response to the reception of the current signal.

FIG. 5 is a graph illustrating the waveform of a voltage signal 520 output from the unijunction transistor in response to a current signal 500 input to the unijunction transistor. Referring to FIG. 5, the current signal 500 is preferably adjusted so that a central line 510 penetrating the middle of a curve (hereinafter, referred to as current variation curve) illustrating the variation of the current signal 500 corresponds to a peak VP 540 of a current-voltage curve of the unijunction transistor and a maximum and a minimum of the current signal 500 can be set to IH and IL, respectively.

In other words, the current converter 220 can adjust the central line 510 of the current variation curve and the maximum and minimum of the current signal 500 by variably setting a and b of Equation (1).

The current signal 500 is input to the unijunction transistor with its magnitude sequentially varying from 1 to 2, from 2 to 3, from 3 to 4, and from 4 to 5. In accordance with the variation of the current signal 500, the magnitude of the voltage signal 520 output from the unijunction transistor sequentially varies from 1' to 2', from 2' to 3', from 3' to 4', and from 4' to 5'.

Here, the current signal 500 varies from 1 to 5 for its one cycle, and the voltage signal 520 varies from 1' to 5' for two cycles of the current signal 500 in accordance with the variation of the current signal 500. Therefore, the voltage signal 520 has two times as high a frequency as the frequency of the current signal 500.

In FIG. 5, the current signal 500 input to the unijunction transistor varies forming a pseudo sine curve, but the voltage signal 520 output from the unijunction transistor varies forming a curve that is very similar to the pseudo sine curve but not exactly the same as the pseudo sine curve. Preferably, but not necessarily, the voltage signal 520 varies forming almost the same as the pseudo sine curve in order to enhance compatibility between the incremental encoding and decoding apparatus 210 according to the exemplary embodiment of the present invention and other existing systems. For example, as the maximum of the current signal 500 increases and the minimum of the current signal 500 decreases or as the position of the central line 510 of the current variation curve of the current signal 500 varies, the voltage signal 520 output from the unijunction transistor may form a curve more deviated from the pseudo sine curve so that a central line 530 penetrating the middle of a curve illustrating the variation of the current signal 520 corresponds to a peak VP 540 of a current-voltage curve of the unijunction transistor and a maximum of the current signal 520 can be set. In addition, the shape and measurements of the current-voltage curve of FIG. 4 or 5 may vary depending on the characteristics of the unijunction transistor.

Therefore, the current converter 220 preferably, but not necessarily, converts a voltage signal input thereto into a current signal by taking advantage of the input and output characteristics of the unijunction transistor. In other words, the current converter 220 needs to adjust the maximum and minimum of the current signal 500 and the position of the central line 510 of the current variation curve of the current signal 500 by controlling the constants a and b of Equation (1) depending on the type of unijunction transistor used in the frequency multiplier 230.

Accordingly, the voltage signal 520, which has two times as high a frequency as the frequency of the current signal 500, is obtained. In short, in response to the receipt of the output signal X of the analog encoder 200, the voltage signal 520, which corresponds to the square of the output signal X of the analog encoder 200, is obtained, and this means the incremental encoding and decoding apparatus 210 can achieve the same effects as an analog multiplier.

The other output signal Y of the analog encoder 200 can be processed in the same manner as the output signal X of the analog encoder 200, thereby obtaining a voltage signal corresponding to the square of the output signal Y of the analog encoder 200. Accordingly, position information obtained when using the two voltage signals output from the frequency converting multipliers 230 and 250 is two times more precise and specific than position information obtained when using only one of the two voltage signals output from the frequency converting multipliers 230 and 250. As described above, a method of obtaining position information from the output signals of the frequency converting multipliers 230 and 250 is well known to those skilled in the art, and thus its detailed description will be omitted.

Figure 7:
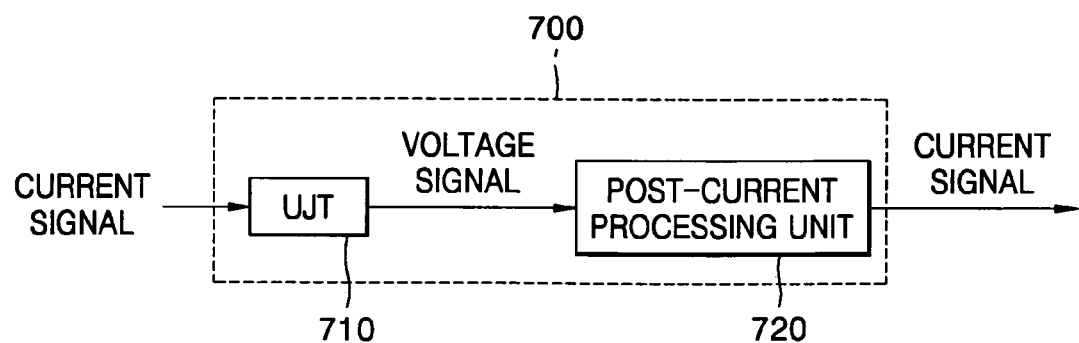
FIG. 7 is a block diagram of one block of an example of the frequency multiplier of FIG. 2, which comprises one unijunction transistor and one post-current processing unit.

Another example of the frequency multiplier 230 of FIG. 2 will now be described in greater detail with reference to FIG. 7. The frequency multiplier 230 may comprise n blocks (where n is an integer greater than 1), and each of the first through n-th blocks comprises one unijunction transistor and a post-current processor. FIG. 7 is a block diagram of one of the first through (n−1)-th blocks of the frequency multiplier 230. Referring to FIG. 7, a block 700 comprises a unijunction transistor 710, which outputs a voltage signal to a post-current processor 720 in response to a current signal input from the current converter 220. The post-current processor 720, which processes the voltage signal so that the voltage signal can be converted into a current signal compatible with a unijunction transistor in a subsequent block, outputs the current signal to the unijunction transistor in the subsequent block.

The voltage signal 520 of FIG. 5 can be used for position determination without being processed. However, preferably, but not necessarily, the voltage signal 520 is converted into the one compatible with the comparator 260, which is a well-known technical feature of conventional systems, or the second analog encoder 270. In order to convert the voltage signal 520 into a signal compatible with the comparator 260 or the second analog encoder 270, the frequency multiplier 230 may comprise a post-voltage processor, which converts the voltage signal 520 to have a predetermined voltage level and a predetermined phase.

Figure 6:
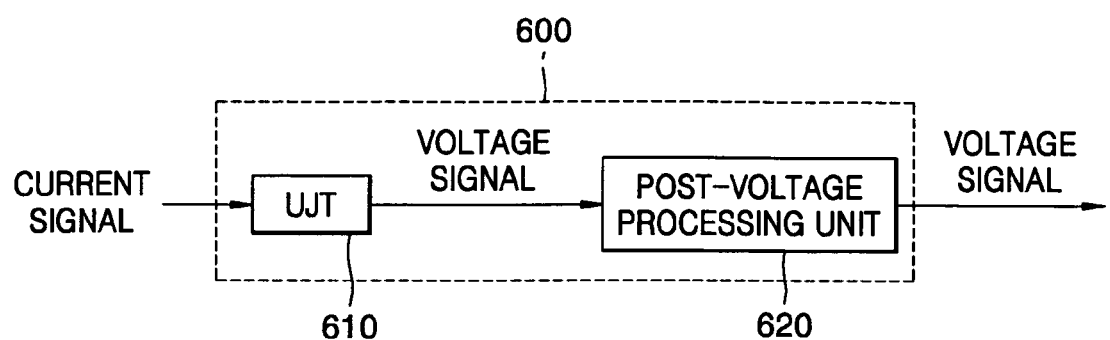
FIG. 6 is a block diagram of an example of a frequency multiplier of FIG. 2 that comprises a unijunction transistor and a post-voltage processor.

FIG. 6 is a block diagram of an example of the frequency multiplier 230 of FIG. 2. Referring to FIG. 6, a frequency multiplier 600 comprises a unijunction transistor unit 610 and a post-voltage processing unit 620. The post-voltage processing unit 620 changes the magnitude and phase of a voltage signal output from the unijunction transistor unit 610 by using a very similar method to the one shown in Equation (1). Thus, a detailed description of the method, in which the post-voltage processing unit 620 changes the magnitude and phase of the voltage signal output from the unijunction transistor unit 610, will be omitted. As a result of the conversion carried out by the post-voltage processing unit 620, a central line of a curve (hereinafter, referred to as voltage variation curve) illustrating the variation of the voltage signal is determined. Accordingly, an output signal of the post-voltage processing unit 620, which can be the voltage signal 520 of FIG. 5, varies forming a curve very similar to the pseudo sine curve.

As shown in FIG. 5, a signal obtained when using one unijunction transistor has twice the precision for position determination than a signal obtained without using any unijunction transistor. Likewise, a signal having two times as high a frequency as the frequency of the signal obtained when using only one unijunction transistor can be obtained by using two unijunction transistors.

Given all this, the frequency multiplier 230 preferably, but not necessarily, comprises a plurality of unijunction transistors and a plurality of post-current processors, which respectively convert voltage signals output from the plurality of unijunction transistors into current signals compatible with unijunction transistors respectively subsequent to the unijunction transistors, from which the current signals are respectively output. For example, the first one of the plurality of unijunction transistors receives a current signal output from the current converter 220 and outputs a voltage signal, and the first one of the plurality of post-current processors converts the voltage signal into a current signal compatible with the input characteristics of the second one of the plurality of unijunction transistors and then outputs the current signal to the second one of the plurality of unijunction transistors, which will be described later in greater detail with reference to FIG. 7.

Another example of the frequency multiplier 230 of FIG. 2 will now be described in greater detail with reference to FIG. 7. The frequency multiplier 230 may comprise n blocks (where n is an integer greater than 1), and each of the first through n-th blocks comprises one unijunction transistor and a post-current processor. FIG. 7 is a block diagram of one of the first through (n−1)-th blocks of the frequency multiplier 230. Referring to FIG. 7, a block 700 comprises a unijunction transistor 710, which outputs a voltage signal to a post-current processor 720 in response to a current signal input from the current converter 230. The post-current processor 720, which processes the voltage signal so that the voltage signal can be converted into a current signal compatible with a unijunction transistor in a subsequent block, outputs the current signal to the unijunction transistor in the subsequent block.

More specifically, the frequency multiplier 230 of FIG. 2 may comprise n blocks. Each of the first through (n−1)-th blocks comprises one unijunction transistor and one post-current processor, and the n-th block comprises one unijunction transistor and a post-voltage processor. The unijunction transistor in the first block receives the current signal from the current converter 220 and outputs a voltage signal to the post-current processor in its block based on the received current signal. Then, the post-current processor processes the voltage signal so that the voltage signal can be converted into a current signal compatible with the unijunction transistor in the second block and outputs the current signal to the unijunction transistor in the second block. Likewise, the unijunction transistor in the n-th block receives a current signal from the (n−1)-th block and outputs a voltage signal to the post-voltage processor in its block based on the received current signal. Then, the post-voltage processor converts the voltage signal to a predetermined voltage level and phase and then outputs the converted voltage signal having the predetermined voltage level and phase, which will now be described in further detail with reference to FIG. 8.

Figure 8:
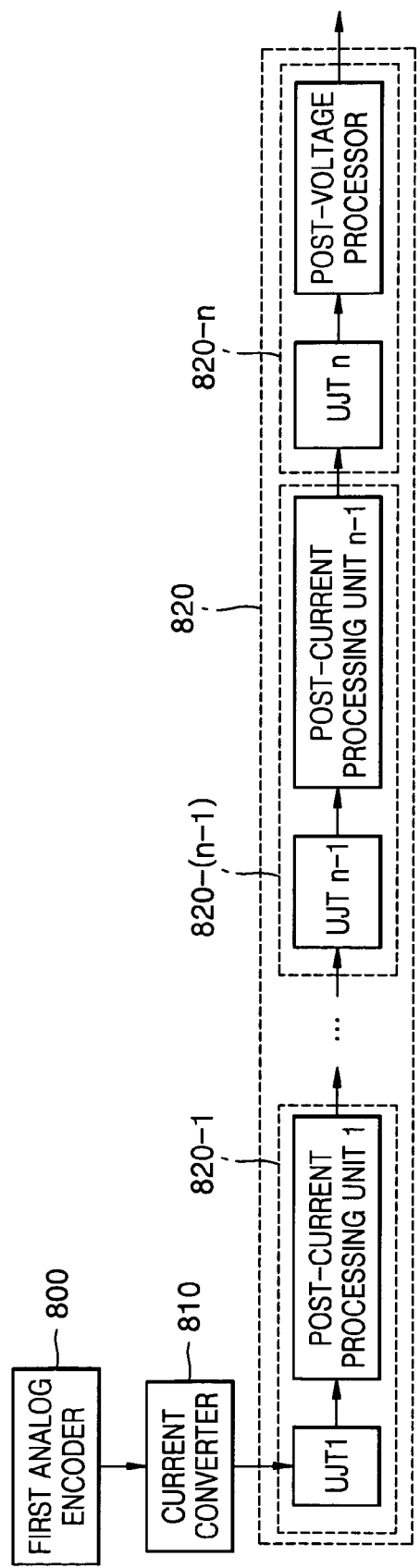
FIG. 8 is a block diagram of an incremental encoding and decoding apparatus according to another exemplary embodiment of the present invention.

FIG. 8 is a block diagram of an incremental encoding and decoding apparatus, which comprises processing a pair of signals output from a first analog encoder 800 and comprises a frequency multiplier 820, according to another exemplary embodiment of the present invention. Referring to FIG. 8, the frequency multiplier 820 comprises n blocks 820-1 through 820n. Each of the first through (n−1)-th blocks 820-1 through 820-(n−1) comprises a unijunction transistor and a post-current processor, and the n-th block 820-n comprises a unijunction transistor and a post-voltage processor. A current signal output from a current converter 810 is adjusted to be compatible with the input characteristics of a first unijunction transistor UJT1 and then input to the first block 820-1. The first unijunction transistor UJT1 outputs a voltage signal with two times as high a frequency as the frequency of the current signal input thereto in response to the corresponding current signal, and a first post-current processor converts the voltage signal into a current signal compatible with the input characteristics of a second unijunction transistor UJT2. Likewise, a current signal processed by an (n−1)-th block 820-(n−1) is input to an n-th block 820-n of the frequency multiplier 820 such that a voltage signal with two times as high a frequency as the frequency of the current signal is output from the n-th block 820-n. Thereafter, the voltage level and phase of the voltage signal output from the n-th block 820-n are adjusted by the post-voltage processor so that the adjustment result can be compatible with existing systems. Thereafter, the adjustment result is output.

Accordingly, the frequency of an analog voltage signal output from the frequency multiplier 820 in response to an analog current signal from the current converter 220 is obtained by multiplying the frequency of the analog current signal by the n-th power of 2, in which case the precision of the position determination increases by the n-th power of 2.

The n unijunction transistors UJT1 through UJTn may be identical having the same input and output characteristics, in which case the n−1 post-current processors may use the same method to process signals output from their respective unijunction transistors.

As described above, it is possible to achieve a desired level of precision of position determination by using a plurality of unijunction transistors and a plurality of post-current processors. In addition, since a unijunction transistor unit that comprises one or more unijunction transistors occupies a smaller area than an analog multiplier, it is possible to reduce the size of an entire system for position determination.

Moreover, since according embodiments of the present invention, a semiconductor device, such as a unijunction transistor, is used to increase the precision of position determination, a processor is unnecessary, and thus it is possible to save system resources.

Embodiments of the present invention can be realized as software or hardware, such as an application specific integrated circuit (ASIC) or a field programmable gate array (FPGA), by using a typical programming technique, which is obvious to those skilled in the art.

Since in the present invention, semiconductor devices, such as one or more unijunction transistors, are used to multiply the frequency of an input current signal and the number of unijunction transistors may be gradually increased, it is possible to achieve a much higher level of precision of position determination than in the prior art. In addition, it is possible to reduce the diameter of a rotation body, such as a servo motor housing, in which the incremental encoding and decoding apparatus according to embodiments of the present invention is installed. Moreover, it is possible to minimize modifications to the configuration of an existing system because the embodiments of the present invention are completely compatible with the existing system. Furthermore, it is possible to save system resources because embodiments of the present invention do not need to be assisted by a processor in order to obtain more precise location information. Still furthermore, since there is no need to use an analog multiplier, which is very expensive, it is possible to reduce the size and manufacturing costs of a product, in which the incremental encoding and decoding apparatus according to the embodiments of the present invention is installed.

While embodiments of the present invention have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An incremental encoding and decoding apparatus, which determines position by processing a pair of analog input signals output from an analog encoder, the incremental encoding and decoding apparatus comprising:
   current converters, which respectively receive the pair of analog input signals and convert the received analog input signals into current signals, each having a predetermined magnitude and phase; and
   frequency converting multipliers, which respectively convert the current signals into voltage signals, each having an increased frequency compared to the frequency of the respective current signals;
   wherein said voltage signals represent position information.

2. The incremental encoding and decoding apparatus of claim 1, wherein each analog input signal is a voltage signal.

3. The incremental encoding and decoding apparatus of claim 2, wherein each voltage signal is a pseudo sine wave signal.

4. The incremental encoding and decoding apparatus of claim 1, wherein each of the frequency converting multipliers comprises at least one unijunction transistor, which receives a current signal output from a corresponding current converter and converts the received current signal into a voltage signal having an increased frequency compared to the frequency of the received current signal.

5. The incremental encoding and decoding apparatus of claim 4, wherein each of the current converters converts a voltage signal input thereto into a current signal compatible with predetermined input characteristics of the unijunction transistor of the frequency converting multiplier.

6. The incremental encoding and decoding apparatus of claim 4, wherein each of the frequency converting multipliers comprises a post-voltage processor, which converts a voltage signal output from a corresponding unijunction transistor into a voltage signal having a predetermined voltage level and phase.

7. The incremental encoding and decoding apparatus of claim 4, wherein each of the frequency converting multipliers comprises a plurality of preceding and subsequent unijunction transistors and a corresponding plurality of post-current processors, each of the post-current processors converting a voltage signal output from the respective preceding unijunction transistor with the exception of the last unijunction transistor into a current signal compatible with input characteristics of the respective subsequent unijunction transistor and outputting the current signal to the respective subsequent unijunction transistor.

8. The incremental encoding and decoding apparatus of claim 7, wherein each of the frequency converting multipliers comprises n unijunction transistors, where n is an integer greater than 1, which respectively output voltage signals, and n−1 post-current processors, which respectively convert voltage signals output from the first through (n−1)-th unijunction transistors into current signals compatible with the input characteristics of the second through n-th unijunction transistors, the first unijunction transistor outputs a voltage signal in response to a current signal output from a corresponding current converter, and the post-voltage processor processes a voltage signal output from the n-th unijunction transistor so that the voltage signal can be converted to have a predetermined voltage level and phase and then outputs the converted voltage signal having the predetermined voltage level and phase.

9. The incremental encoding and decoding apparatus of claim 4, wherein each of the frequency converting multipliers comprises n unijunction transistors, where n is an integer greater than 1, which respectively output voltage signals, and n−1 post-current processors, which respectively convert voltage signals output from the first through (n−1)-th unijunction transistors into current signals compatible with the input characteristics of the second through n-th unijunction transistors, the first unijunction transistor outputs a voltage signal in response to a current signal input from a current converter, and the post-voltage processor processes a voltage signal output from the n-th unijunction transistor so that the voltage signal can be converted to have a predetermined voltage level and phase and then outputs the converted voltage signal having the predetermined voltage level and phase.

10. The incremental encoding and decoding apparatus of claim 9, wherein the voltage signals output from the n unijunction transistors have a frequency two times higher than the frequency of signals input thereto.

11. The incremental encoding and decoding apparatus of claim 9, wherein the voltage signals output from the n unijunction transistors have a frequency two times higher than the frequency of signals input thereto.

12. An incremental encoding and decoding method, which determines position by processing a pair of analog input signals output from an analog encoder, the incremental encoding and decoding method comprising the steps of:
   (a) receiving the pair of analog input signals;
   (b) converting each of the analog input signals into a respective current signal having a predetermined magnitude and phase; and
   (c) converting each of the current signals into a voltage signal having an increased frequency compared to the frequency of the current signal;
   wherein said voltage signals represent position information.

13. The incremental encoding and decoding method of claim 12, wherein each of the received analog input signals is a voltage signal.

14. The incremental encoding and decoding method of claim 13, wherein each of the voltage signals is a pseudo sine wave signal.

15. The incremental encoding and decoding method of claim 12, wherein in step (c), each of the current signals is input to a respective unijunction transistor having predetermined input characteristics, and a voltage signal output from the respective unijunction transistor in response to the current signal has an increased frequency compared to the frequency of the current signal.

16. The incremental encoding and decoding method of claim 15, wherein in step (b), each of the analog input signals is converted into a respective current signal based on the input characteristics of the unijunction transistor.

17. The incremental encoding and decoding method of claim 15, wherein in step (c), the voltage signal has a frequency two times higher than the frequency of the current signal.

18. The incremental encoding and decoding method of claim 17, wherein in step (b), each of the analog input signals is converted into a respective current signal based on the input characteristics of the unijunction transistor.

* * * * *